United States Patent [19]
McVicar et al.

[11] Patent Number: 5,412,205
[45] Date of Patent: May 2, 1995

[54] SCANNER WITH A WING-SHAPED FLUORESCENT TUBE HOUSING AND DUAL-FACETED SCAN WINDOW

[75] Inventors: David N. McVicar, Placerville; Mohammad Ali-Safai, San Jose, both of Calif.

[73] Assignee: Logitech, Inc., Fremont, Calif.

[21] Appl. No.: 154,735

[22] Filed: Nov. 18, 1993

[51] Int. Cl.6 ............................ H01J 3/14; H01J 5/16
[52] U.S. Cl. .................................. 250/234; 235/472
[58] Field of Search .......................... 250/234–236; 235/472, 467, 470, 454–456; 358/493–494

[56] References Cited

U.S. PATENT DOCUMENTS

| | | | |
|---|---|---|---|
| 4,300,123 | 11/1981 | McMillin et al. | 235/456 |
| 4,794,241 | 12/1988 | Carsner et al. | 235/474 |
| 5,233,171 | 8/1993 | Baldwin | 235/470 |

*Primary Examiner*—Stephone B. Allen
*Attorney, Agent, or Firm*—Townsend and Townsend Khourie and Crew

[57] ABSTRACT

A hand scanner employs either uniformly or variably frosted scan windows to control illumination. For scanning color documents including books and magazines, a hand scanner employs a fluorescent tube mounted a certain distance above the lower surface of the scanner housing. At the fluorescent tube ends, corresponding to the illumination "dead space" of the fluorescent tube, the underlying portion of the scanner housing is recessed towards the tube.

15 Claims, 5 Drawing Sheets

SECTION B-B

SECTION B-B

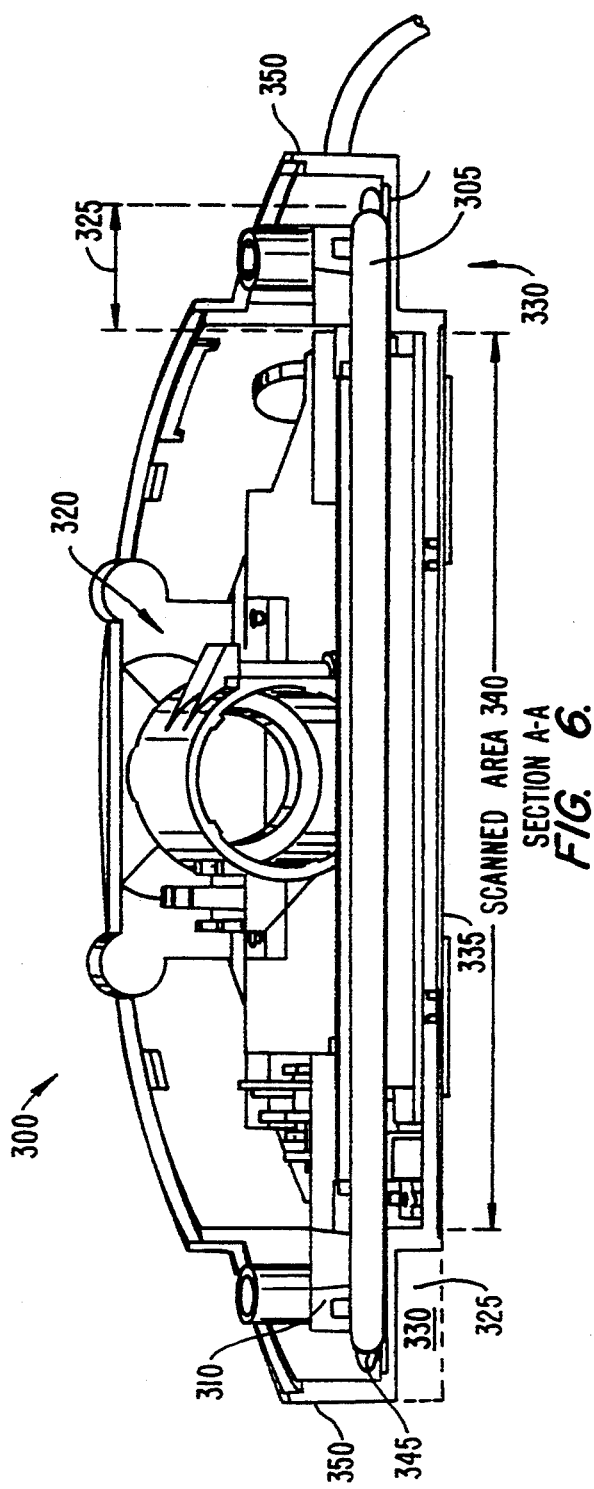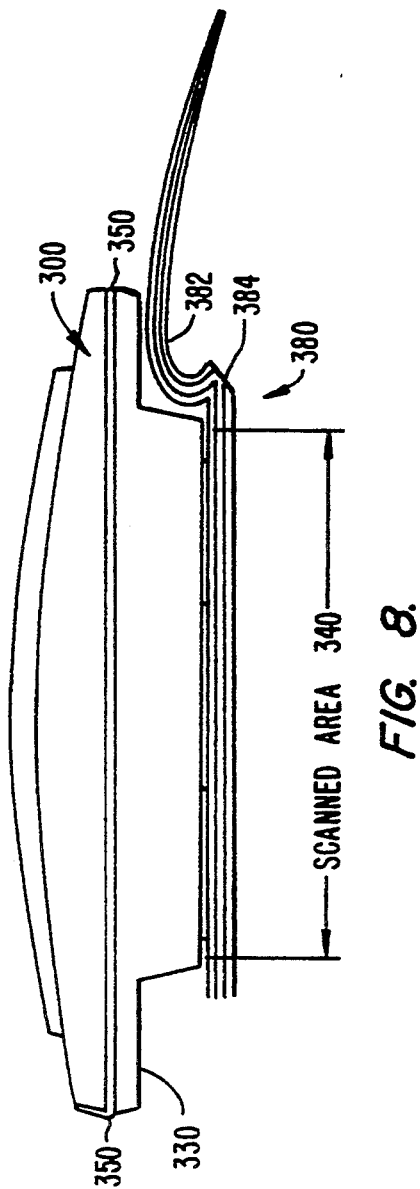

SCANNER WITH A WING-SHAPED FLUORESCENT TUBE HOUSING AND DUAL-FACETED SCAN WINDOW

CROSS REFERENCE TO RELATED APPLICATIONS

This application is related to a Design Patent Application entitled "SCANNER WITH WINGS FOR HOLDING A FLUORESCENT TUBE", U.S. patent application No. 29/017,283, filed on Nov. 18, 1993, which is hereby incorporated by reference, in its entirety, for all purposes.

BACKGROUND OF THE INVENTION

This invention relates generally to image scanners. More specifically, one aspect of the present invention relates to an improved scan window in a scanner, and another aspect of the present invention relates to an improved configuration for scanners employing a fluorescent tube.

FIG. 1 is a cross-sectional view of an existing handheld scanner 100. It includes a housing 102 with a scan window 104. An LED bar 106, a reflective element 108, a lens assembly 110 and a sensor 112 provide the scanning mechanism for the scanner 100. A medium to be scanned, typically a sheet of paper 120 having a surface 122 upon which an image resides, lies beneath the scan window 104.

In operation, the LED bar 106 emits light. The emitted light passes through a first facet 130 of the scan window 104, strikes the surface 122 of the medium 120 and is reflected. Some of the reflected radiation passes through a second facet 132 of the scan window 104 and strikes the reflective element 108. The reflective element 108 directs the reflected light passing through the second facet 132 to the sensor 112 after passing it through the lens assembly 110. An image on the surface 122 of the medium 120 is detected by the sensor 112 through variations in reflected light intensity as the sensor is moved in the direction indicated by arrow 140, as is well known in the art.

The hand scanner 100 has a number of disadvantages. One difficulty with hand scanner 100 is that the lens assembly does not have a uniform responsiveness across a scan width. The scanner 100 typically scans about four inches at one time. The LED bar 106 has a plurality of LED elements arrayed along this width, each emitting light. The lens assembly 110 tends to be more responsive to reflected light in the middle of the scan than towards the edges of a scan, meaning that images are both artificially brighter in the middle and artificially darker at the edges. This is not desirable in scans producing gray scale or color equivalents of an image. One solution to this problem has been to tailor an output profile of the LED bar 106 to compensate for the response of the lens assembly 110. First, the transmission profile of the lens assembly, such as shown in FIG. 2A, is determined. Next, a desired LED output profile is computed as the inverse of the lens assembly transmission profile, such as shown in FIG. 2B. The LED bar 106 output is then tailored to the computed profile by use of resistors, for example.

One important consideration in image scanning is to achieve maximum intensity of incident light to provide sufficient contrast for image development. For this reason, the first facet 130 and the second facet are made transparent to reduce attenuation of the light from the LED bar 106. However, foreign deposits on the scan window can obscure the image. The second facet 132 is raised from the area of the medium surface 122 being scanned. This can be alleviated, as shown in FIG. 1, by the shape of the scan window 104. The lens assembly 110 has a focal point at the surface 122. The raised position of the second facet 132, placing it outside the focal point, decreases incidences of false images due to foreign matter deposited on the scan window 104.

Another potential source of image degradation is from the individual LEDs elements of the LED bar 106. FIG. 3 is a view of the LED bar 106 comprising several LEDs 150. As shown, each LED 150 has a light-emitting element 152 encased in a protective lens 154. Each LED 150 emits light in a conic illumination field 160. As a distance from the LED bar 106 extends outward, the conic illumination fields 160 from the several LEDs 150 begin to converge and overlap. Desirably the paper surface is positioned at that distance from the LED bar 106 where the illumination fields begin to overlap, as shown at position 200 in FIG. 3. If the paper surface 122 is too close, position 202, or too far away, position 204, image artifacts can be produced. The artifacts develop from the variation of the incident radiation on the image. It is difficult to accurately position and maintain the paper surface at the desirable distance from the LED bar 106.

Another drawback to the use of LEDs arises in the scanning of color images. Because LEDs generally produce monochromatic light, a scanner employing LEDs for illumination will be partially "colorblind". To avoid this problem, some scanners illuminate the matter to be scanned by fluorescent tubes, which produce light having a broadband frequency distribution.

Not without their drawbacks as well, though, fluorescent tubes require a socket at each end, creating an illumination "dead space" at either end of the tube, as illustrated in FIG. 4. Additionally, the illumination provided by a fluorescent tube is dim in the regions adjacent the sockets. This increases the effective illumination dead space, which necessitates the scanning device being wider than the image field to be illuminated. These problems with fluorescent tubes can be particularly problematic when scanning materials such as books. When scanning a page on one side of a book, the pages on the other side typically arc upwards, and for a scanner wider than its field of illumination, can prevent the scanner from properly scanning the centermost edge of text. Prior art techniques for minimizing this problem typically involve attempting the minimize the width of the fluorescent tube sockets. However, the technical limits to this approach make it an unsatisfactory solution for the physical drawbacks of fluorescent tubes.

SUMMARY OF THE INVENTION

The present invention provides an improved hand scanner avoiding the above mentioned problems of the prior art. One aspect of the present invention is directed to improved scan windows, and includes two preferred embodiments. One embodiment of the scan window provides a uniform slight frosting or texturing to the first facet of the scan window proximate to the LED bar. This texturing helps to diffuse the conic illumination fields, which reduces the image artifacts due to the positioning of the paper surface relative to the LED bar 106. The second embodiment of the scan window provides for a variable frosting or texturing, which shapes the output profile of the light source, while still providing the benefits of the uniform texturing, i.e. the reduction of image artifacts. This output profile shaping is especially beneficial in scanners that employ light sources other than LEDs, such as fluorescent tubes, whose output profile may not be as easy to directly modify as that of the LED bar.

A second aspect of the present invention is directed to an improved configuration for a scanner employing a fluorescent tube light source, to facilitate the scanning of books, magazines, and similar materials. A scanner according to this second aspect of the present invention has a fluorescent tube mounted a certain distance above the lower surface of the scanner housing. At the fluorescent tube ends, corresponding to the illumination "dead space" of the fluorescent tube, the underlying portion of the scanner housing is recessed towards the tube. The scan area covers essentially all of the distance between these recessed portions. This provides the advantage that when a side of a book is being scanned, the end of the fluorescent tube at the center of the book may simply pass over the arced-up pages of the other side of the book, by virtue of the housing recess. This allows scanning of colored text and images essentially right up to the center of the book, which is not possible with prior art fluorescent tube scanners.

A further understanding of the nature and advantages of the invention may be realized by reference to the remaining portions of the specification and the drawings.

BRIEF DESCRIPTION OF THE DRAWINGS

FIG. 6 is a cross sectional view of the scanner of FIG. 5, taken through line AA.

FIG. 8 shows a scanner with wings according an aspect of the present invention being used to scan a magazine.

DETAILED DESCRIPTION OF THE PREFERRED EMBODIMENT

Figure 5:
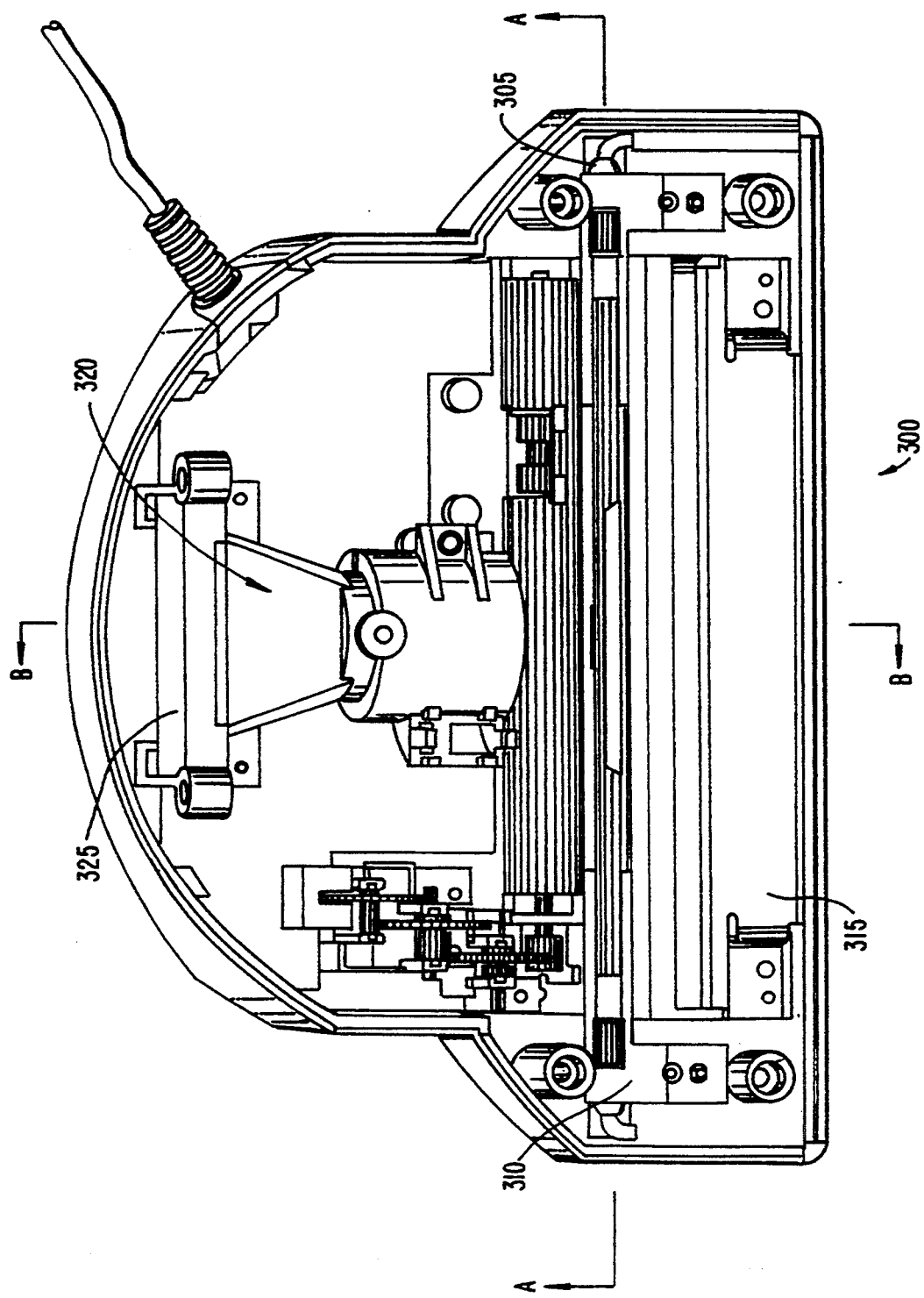
FIG. 5 is a cut-away top view of a particular embodiment of a hand held scanner according to one aspect of the present invention.

FIG. 5 shows a hand held scanner 300 according to one aspect of the present invention. Scanner 300 employs as a light source a fluorescent tube 305 secured within tube holder 310. Light from fluorescent tube 305 is reflected by a document image and redirected by mirror assembly 315 through lens assembly 320 and onto sensor 325. FIG. 6 shows a cross sectional view of scanner 300, taken through line AA. This view again shows fluorescent tube 305, tube housing 310, and lens assembly 320. Also shown in FIG. 6 are dimly illuminating "dead area" 325 of fluorescent tube 305, undercut area 330 of the housing of scanner 300, the scanning surface 335 and scanned area 340 of scanner 300, fluorescent tube sockets 345, and raised "wings" 350. As discussed above, fluorescent tube sockets 345 prevent the scanning of images under those portions. Furthermore, the dim illumination provided by dead areas 325 is poorly suited for use by the scanner. For these reasons, the actual scanning area 340 is limited to the space between the dead areas 325 of fluorescent tube 305.

To minimize the extent to which the space taken up by sockets 345 and dead areas 325 will interfere with the scanning of books and magazines, fluorescent tube 305 is raised from scanning surface 335 by a predetermined distance and the housing of scanner 300 is recessed towards the tube at undercut areas 330 to form wings 350. The optimum height for fluorescent tube 305 depends upon the desired range of thicknesses for books and magazines to be scanned, and can also be constrained by the scanner configuration. For example, a desirable height for fluorescent tube 305 is around 10mm, but the particular configuration of scanner 300 limits this height to about 7 mm, as shown in FIG. 7, which is a cross sectional view of scanner 300, taken through line BB shown in FIG. 5.

Figure 7:
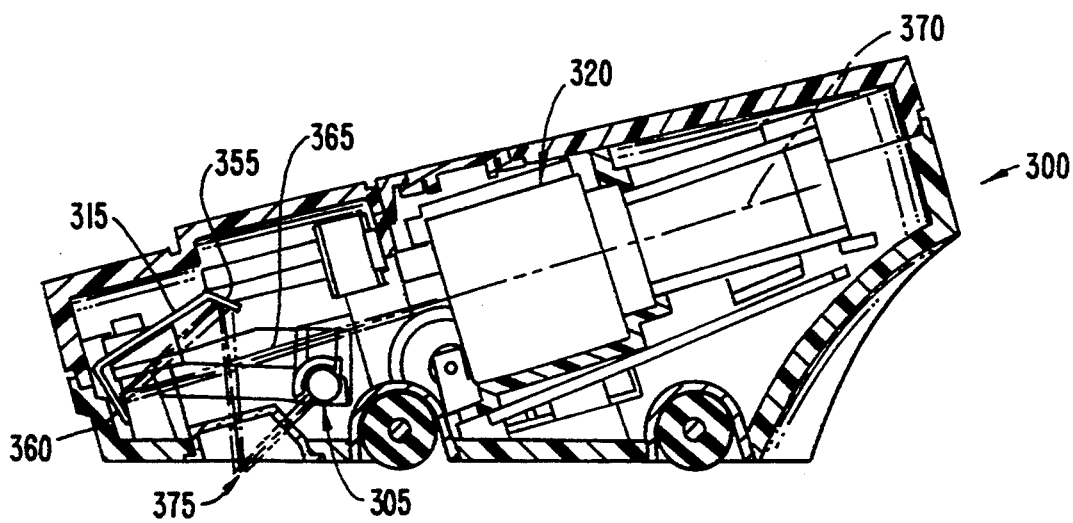
FIG. 7 is a cross sectional view of the scanner of FIG. 5, taken through line BB.

Referring to FIG. 7, mirror assembly 315 is shown to include a first mirror surface 355 and a second mirror surface 360, and fluorescent tube 305 is shown mounted within lamp housing 365. Also shown in FIG. 7 is light path 370, which begins at fluorescent tube 305, is reflected by scanned image 375, first mirror surface 355, and second mirror surface 360 so as to pass through lens assembly 320. As shown, the portion of light path 370 between second mirror surface 360 and lens assembly 320 passes just above fluorescent tube 305 and constrains its height.

The magazine/book scanning advantages of a scanner with wings are illustrated in FIG. 8. Scanner 300 is shown scanning magazine 380 with pages 382 arcing upwards. As shown, scanned area 340 can approach essentially all the way to magazine binding 384, while scanner wing 350, containing the fluorescent tube end, passes over arced pages 382.

Figure 9:
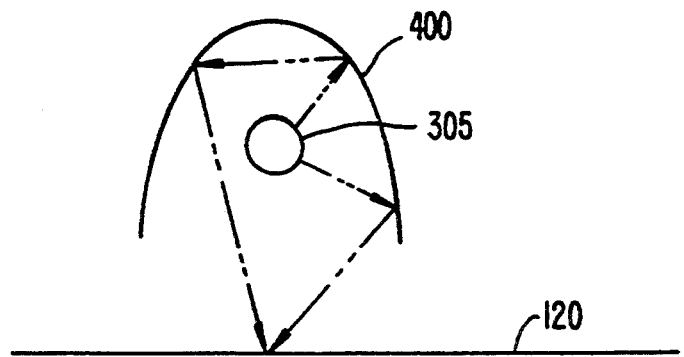
FIG. 9 illustrates a cross section of an elliptical reflector for focusing light from a scanner fluorescent tube.

Because the fluorescent tube ends, which produce dim illumination, are substantially contained in wings 350, and not used for illumination by scanner 300, the effective light output profile of fluorescent tube 305 is substantially even. To focus the light in a bright line most useful for scanning, an elliptic reflector may be used, as shown in FIG. 9. An ellipse has two foci. It is a characteristic of an ellipse that light passing through one focus of an elliptic mirror will be reflected through the other focus. This may be contrasted to a mirror having a parabolic cross section, which will reflect light so as to have parallel rays. Referring to FIG. 9, with fluorescent tube 305 is positioned so as to be centered at a focus of a mirror 400 having an elliptic cross section, with document 120 passing through the other focus, light from fluorescent tube 305 is focused on document 120. The elliptic reflector may further be used to adjust the effective light output profile of the fluorescent tube, by varying the reflectance of the elliptic mirror along its length.

Figure 1:
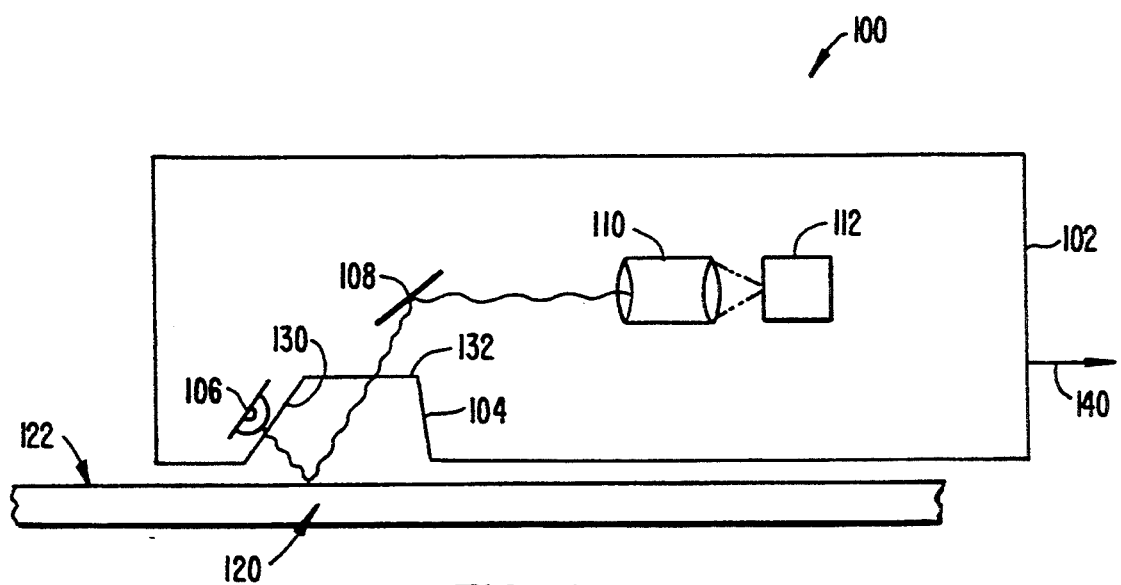
FIG. 1 is a cross-sectional view of an existing hand-held scanner 100.
Figure 2A:
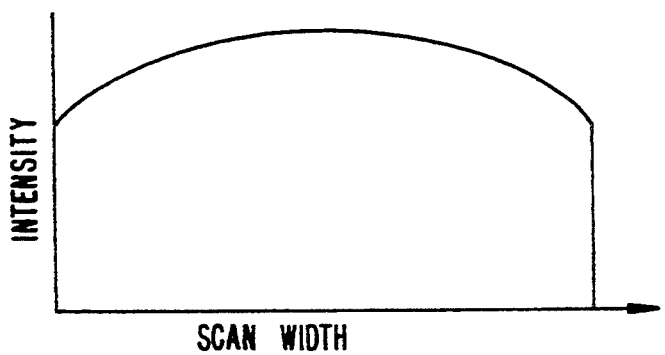
FIG. 2A is a graph of a transmission profile of a scanner lens assembly along a scan line.
Figure 2B:
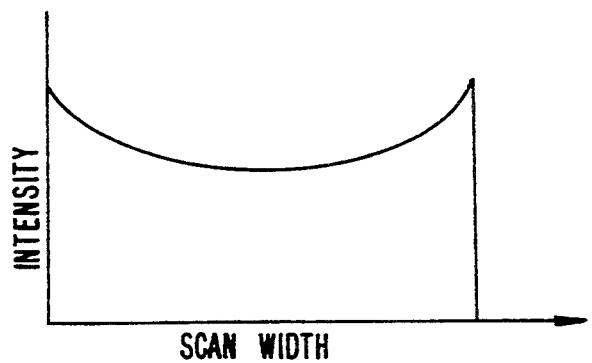
FIG. 2B is a graph of a compensating shaped illumination profile of a scanner LED line.
Figure 3:
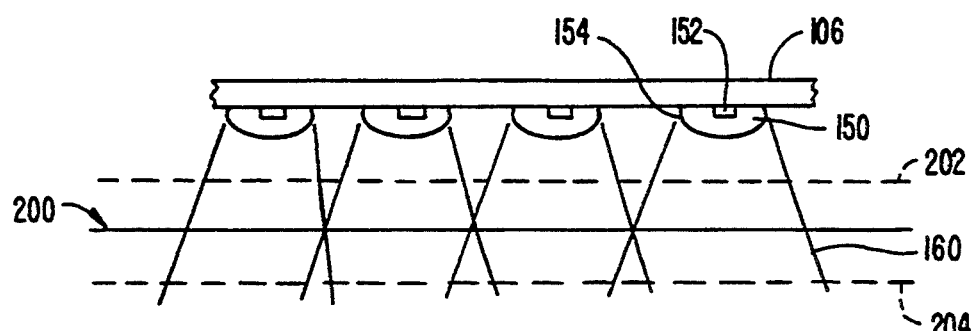
FIG. 3 is a view of a conventional LED bar illuminating a scanned surface.
Figure 4:
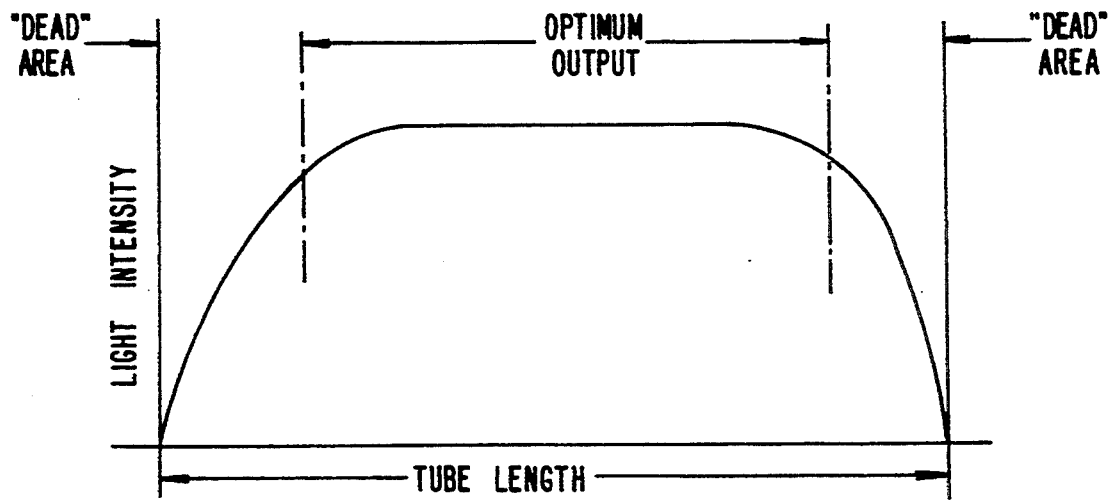
FIG. 4 is a graph of a light output profile of a fluorescent tube.
Figure 10:
FIG. 10 is a top view of a particular embodiment of a scan window having uniform frosting, according to an aspect of the present invention.
Figure 11:
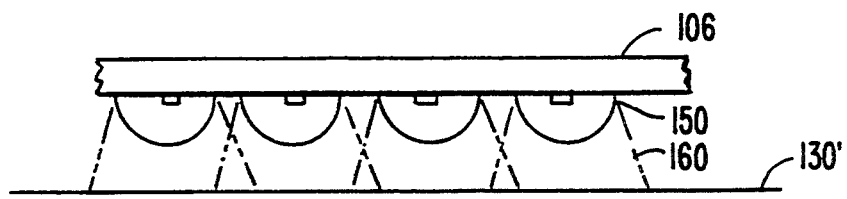
FIG. 11 illustrates the diffusion of light by the scan window of FIG. 10.

FIG. 10 illustrates a scan window 104' having a uniformly and lightly frosted first facet 130' through which light passes on its way from the scanner light source to the document surface being scanned. Facet 130' is preferably generally planar, and extends along the length of the light source. The frosting can be created by lightly scoring or otherwise texturing the facet surface. The frosting is preferably very light, so that the light does not undergo excessive attenuation. The frosting serves to diffuse and evenly distribute the light emitted by the illumination element, so that illumination artifacts, such as described with reference to FIG. 3, are minimized. This diffusion is illustrated in FIG. 11, in which the conic illumination fields 160 produced by the LEDs 150 of LED bar 106 are diffused/dispersed into a uniform illumination by facet 130' of the scan window. The uniform texturing of facet 130' is of primary benefit with light sources which are composed of a plurality of individual lighting sub-units such as LEDs.

Figure 12:
FIG. 12 is a top view of a particular embodiment of a scan window having varying frosting, according to an aspect of the present invention.

A further refinement of the frosted scan window is to provide a variable frosting, such as shown in FIG. 12, which allows further illumination shaping. The variable frosting of scan window facet 130" is more concentrated and dense at the center, and lighter towards the edges. This frosting gradient may be simply lengthwise along the facet, or frosting may be graded both lengthwise and widthwise. The heavier frosting at the center of the window causes greater attenuation at that point than at the edges, where the frosting is lighter. The variable attenuation shapes the light source output profile. This output profile shaping is especially beneficial in scanners that employ light sources other than LEDs, such as fluorescent tubes, whose output profile may not be as easy to directly modify as that of the LED bar.

It is to be understood that the above description is intended to be illustrative and not restrictive. Many variations and equivalents will be apparent to those of skill in the art upon reviewing the above description. The scope of the invention should, therefore, be determined with reference to the appended claims, along with the full scope of equivalents to which such claims are entitled.

What is claimed is:

1. A scan window for a scanner having a light source, comprising:
   a frosted planar facet interposed between the light source and an image to be scanned for diffusing light from the light source to said image; and
   an untextured transparent planar facet, coupled to said frosted planar facet, and positioned for receiving light reflected from said image and passing it to an optical system having a sensor.

2. The scan window of claim 1 wherein said frosted facet has a textured surface.

3. The scan window of claim 2 wherein said textured surface is uniformly textured.

4. The scan window of claim 2 wherein said textured surface has a nonuniform texture.

5. The scan window of claim 4, wherein the scan window has a length, and wherein said nonuniform texture is denser at a center portion of said textured surface than at portions of said textured surface displaced lengthwise from said center portion.

6. A method for scanning an image using light from a light source, comprising the steps of:
   diffusing emitted light from the light source by passing the light through a frosted facet of a scan window interposed between the light source and the image; and
   passing light reflected from the image through a transparent facet of said scan window to an optical system including a sensor.

7. The scanning method of claim 6, further comprising the step of providing a nonuniform texture for said frosted facet, and wherein said diffusing step further comprises shaping an output profile of the light source by passing said light through said frosted facet.

8. A scanner comprising:
   a scan surface;
   a cylindrical light source having ends and raised above said scan surface; and
   wings, raised above said scan surface, for holding said cylindrical light source ends.

9. The scanner of claim 8, wherein said wings have lower wing surfaces, and wherein said scanner further comprises a housing having a lower housing surface including said scan surface and said lower wing surfaces, and wherein said lower wing surfaces are formed by portions of said lower housing surface recessed from said scan surface by a predetermined distance.

10. The scanner of claim 9, wherein said predetermined distance is at least around 7 mm.

11. The scanner of claim 8, wherein said cylindrical light source is a fluorescent tube.

12. The scanner of claim 8, further comprising means for shaping a light output profile of said cylindrical light source.

13. The scanner of claim 12, wherein said shaping means comprises a frosted planar facet interposed between the light source and an image to be scanned for diffusing light from the light source to said image, said frosted planar facet having a nonuniform texture, and wherein said nonuniform texture is denser at a center portion of said frosted planar facet than at portions of said frosted planar facet displaced lengthwise from said center portion.

14. The scanner of claim 12, wherein said shaping means comprises an elliptic reflector.

15. The scanner of claim 14, wherein said elliptic reflector has a varying reflectance along its length.

* * * * *